(12) United States Patent
Nocket et al.

(10) Patent No.: US 12,392,890 B2
(45) Date of Patent: Aug. 19, 2025

(54) VISION SYSTEM FOR A VEHICLE-TRAILER SYSTEM

(71) Applicant: Toyota Motor Engineering & Manufacturing North America, Inc., Plano, TX (US)

(72) Inventors: Michael J. Nocket, Frisco, TX (US); Tyler J. Kass, Hickory Creek, TX (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 135 days.

(21) Appl. No.: 18/499,070

(22) Filed: Oct. 31, 2023

(65) Prior Publication Data

US 2025/0136022 A1 May 1, 2025

(51) Int. Cl.
*G01S 13/90* (2006.01)
*B60R 11/04* (2006.01)
*G01S 13/00* (2006.01)
*H04B 7/02* (2018.01)
*H04L 5/00* (2006.01)

(52) U.S. Cl.
CPC .............. *G01S 13/90* (2013.01); *B60R 11/04* (2013.01); *G01S 13/00* (2013.01); *H04B 7/02* (2013.01); *H04L 5/00* (2013.01)

(58) Field of Classification Search
CPC ...... G01S 13/89; G01S 13/90; G01S 13/9023; G01S 5/00; G01S 5/022; G01S 5/06; G01S 7/00; G01S 7/02; H04B 7/06; H04B 17/24; H04B 17/336; H04L 5/00; H04L 5/0007; H04L 5/0023; H04N 5/44; H04N 5/60

See application file for complete search history.

(56) References Cited

U.S. PATENT DOCUMENTS

| | | | |
|---|---|---|---|
| 11,385,325 B2 | 7/2022 | Brown et al. | |
| 2008/0291077 A1* | 11/2008 | Chang | G01S 13/89 |
| | | | 342/179 |
| 2017/0217372 A1 | 8/2017 | Lu et al. | |

(Continued)

OTHER PUBLICATIONS

Halperin et al. "802.11 with Multiple Antennas for Dummies", ACM SIGCOMM Computer Communication Review, vol. 40, issue 1. 2010.

*Primary Examiner* — Van T Trieu
(74) *Attorney, Agent, or Firm* — Christopher G. Darrow; Darrow Mustafa PC

(57) ABSTRACT

A vision system for a vehicle-trailer system includes a vehicle-mounted receiver, a pair of spaced-apart vehicle-mounted Wi-Fi antennas, and a dual-antenna trailer-mounted camera system including a Wi-Fi camera configured to transmit waveforms incorporating video data to the receiver via the vehicle-mounted Wi-Fi antennas. The vision system is configured to estimate and apply phase shifts to video signals prior to transmission of the signals to the receiver. This may provide (at the receiver) a video signal having the best signal-to-noise ratio available for any given configuration and position of the trailer with respect to the vehicle, and despite any obstacles blocking line-of-sight for transmission between the camera system antennas and the vehicle Wi-Fi antennas. This may enable the trailer camera to be mounted at a location on the trailer where it can provide the best view of any particular portion of the trailer surroundings.

12 Claims, 3 Drawing Sheets

(56) References Cited

U.S. PATENT DOCUMENTS

| | | | | |
|---|---|---|---|---|
| 2018/0224524 A1* | 8/2018 | Gunn | .................. | G01S 5/06 |
| 2019/0356401 A1* | 11/2019 | Levy | .................. | H04L 5/0007 |
| 2025/0012895 A1* | 1/2025 | Javadi | .................. | G01S 7/418 |

* cited by examiner

VISION SYSTEM FOR A VEHICLE-TRAILER SYSTEM

TECHNICAL FIELD

The subject matter described herein relates to a vehicle vision system for a vehicle and, more particularly, to a vehicle vision system that utilizes one or more cameras mounted on a trailer towed by the vehicle.

BACKGROUND

When a vehicle is towing a trailer, an add-on camera (e.g. a battery powered camera) may be mounted along a rear of the trailer to function as a backup camera. The camera may be configured to wirelessly transmit video signals to a receiving antenna located on the towing vehicle. The antenna may be connected to a receiver mounted in the vehicle and configured for communicating received video signals to one or more displays (e.g., screen displays or head-up displays) positioned in the vehicle. The vehicle antenna may also be configured to wirelessly transmit camera control commands from the vehicle to the camera. However, as the towing vehicle turns, line-of-sight transmission paths between the trailer camera and the vehicle antenna may become obstructed or lost. Another possible problem is the initial positioning of the camera in a location where the signal transmission path is blocked by the structure of the trailer itself, even when the vehicle-trailer system is moving in a straight line. When such situations occur, signals transmitted between the trailer camera and the vehicle antenna may be weakened or distorted, which may lead to degradation and/or interruption of the images presented on the vehicle display(s).

SUMMARY

In one aspect of the embodiments described herein, a vision system for a vehicle-trailer system is configured to maximize a signal-to-noise ratio (SNR) based on a video signal received from a trailer-mounted camera system. The vision system includes a vehicle-mounted receiver, a pair of spaced-apart vehicle-mounted Wi-Fi antennas, and a dual-antenna trailer-mounted camera system configured to transmit a waveform incorporating video data to the vehicle-mounted Wi-Fi antennas. The receiver includes a processor and a memory communicably coupled to the processor. The receiver memory stores a display control module configured to determine a signal-to-noise ratio based on estimated waveforms received from the camera system antennas via the vehicle-mounted Wi-Fi antennas. The display control module is also configured control operation of at least one vehicle display to display a video signal based on the received waveforms. The camera system includes a processor and a memory communicably coupled to the processor. The camera memory stores a camera control module configured to, using the SNR and link characterization information, estimate a phase shift to be applied to each future waveform to be transmitted by an associated camera system antenna, to increase a signal-to-noise ratio based on future waveforms received by the receiver from the vehicle Wi-Fi antennas. The camera control module is also configured to apply each phase shift to an associated future waveform to provide estimated waveforms. The camera control module is also configured to control operation of the camera system antennas to transmit the estimated waveforms through the vehicle Wi-Fi antennas to the receiver for determination of a signal-to-noise ratio based on the received estimated waveforms.

In another aspect of the embodiments described herein, provided is a method of maximizing a signal-to-noise ratio (SNR) of a video signal received from a dual antenna trailer-mounted camera system in a vehicle-trailer system. The method includes a step of, in a vehicle-mounted receiver, determining a signal-to-noise ratio based on estimated waveforms received from the camera system antennas via a pair of spaced-apart vehicle-mounted Wi-Fi antennas. The method also includes steps of, in the camera system: using the signal-to-noise ratio and link characterization information, estimating a phase shift to be applied to each future waveform to be transmitted by an associated the camera system antenna, to increase a signal-to-noise ratio based on future waveforms received by the receiver from the vehicle Wi-Fi antennas; applying each phase shift to an associated future waveform to provide estimated waveforms; and controlling operation of the camera system antennas to transmit the estimated waveforms through the vehicle Wi-Fi antennas to the receiver for determination of a signal-to-noise ratio based on the received estimated waveforms.

In yet another aspect of the embodiments described herein, provided is a non-transitory computer-readable medium for of maximizing a signal-to-noise ratio (SNR) of a video signal received from a dual antenna trailer-mounted camera system of a vehicle-trailer system. The medium stores instructions that, when executed by one or more processors cause the processors to, in a vehicle-mounted receiver, determine a signal-to-noise ratio based on estimated waveforms received from the camera system antennas via a pair of spaced-apart vehicle-mounted Wi-Fi antennas. The medium also stores instructions that, when executed by one or more processors cause the processors to, in the camera system: using the signal-to-noise ratio and link characterization information, estimate a phase shift to be applied to each future waveform to be transmitted by an associated the camera system antenna, to increase a signal-to-noise ratio based on future waveforms received by the receiver from the vehicle Wi-Fi antennas; apply each phase shift to an associated future waveform to provide estimated waveforms; and control operation of the camera system antennas to transmit the estimated waveforms through the vehicle Wi-Fi antennas to the receiver for determination of an signal-to-noise ratio based on the received estimated waveforms.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

DETAILED DESCRIPTION

Embodiments described herein relate to a vision system for a vehicle-trailer system. The vision system includes a vehicle-mounted receiver, a pair of spaced-apart vehicle-mounted Wi-Fi antennas, and a dual-antenna trailer-mounted camera system including a Wi-Fi camera configured to transmit waveforms incorporating video data to the receiver via the vehicle-mounted Wi-Fi antennas. The camera system is configured to estimate a phase shift to be applied to each future waveform to be transmitted by an associated camera system antenna, to increase a signal-to-noise ratio based on waveforms received by the receiver from the vehicle Wi-Fi antennas. The camera system is also configured to apply the estimated phase shifts to the video signals prior to transmission to the receiver. The receiver is configured to determine a signal-to-noise ratio (SNR) based on the waveforms received from the camera system and to provide feedback to the camera system usable for estimating and applying further phase shifts to newly acquired video signals to be transmitted to the receiver. Using the systems and procedures described herein, embodiments of the vision system may constantly and automatically apply phase-shifts to waveforms to be transmitted from the camera to the vehicle receiver, to provide (at the receiver) a video signal having the best signal-to-noise ratio available for any given configuration and position of the trailer with respect to the vehicle, and despite any obstacles blocking line-of-sight for transmission between the camera system antennas and the vehicle Wi-Fi antennas. This may enable the trailer camera to be mounted at a location on the trailer where it can provide the best view of any particular portion of the trailer surroundings.

Figure 1:
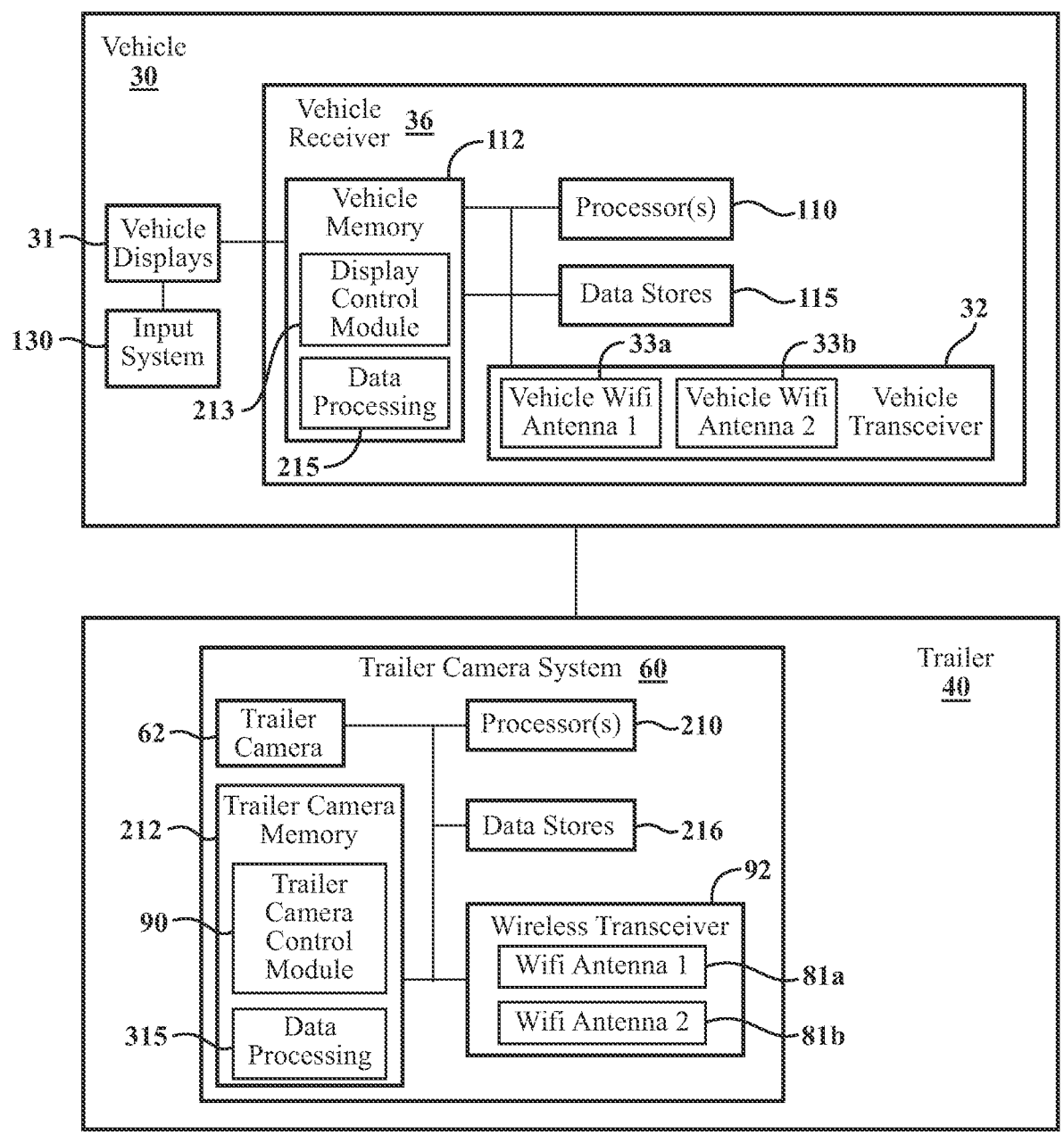
FIG. 1 is a schematic block diagram of a vehicle-trailer system incorporating a vision system in accordance with an embodiment described herein.

FIG. 1 shows a schematic block diagram of a vehicle-trailer system 20 incorporating a vision system configured to maximize a signal-to-noise ratio (SNR) of a video signal received from a trailer-mounted camera system of the vision system. As described herein, a "vehicle-trailer system" may include a vehicle 30 and a trailer 40 connected to the vehicle 30 so as to enable the vehicle to tow the trailer. When the attached trailer 40 is being towed by the vehicle 30 along a road or other surface, the vehicle-trailer system 20 becomes a "moving vehicle-trailer system". The term "trailer" may encompass camper trailers, cargo trailers, and any other type of trailer on which a trailer camera system having the features and capabilities described herein may be mounted.

As used herein, a "vehicle" is any form of motorized transport. In one or more implementations, the vehicle 30 is a passenger vehicle. While arrangements will be described herein with respect to passenger vehicles, it will be understood that embodiments are not limited to passenger vehicles. In some implementations, the vehicle 30 may be any form of motorized transport that benefits from the functionality discussed herein.

The vehicle 30 includes various elements. The vehicle 30 can have any combination of the various elements shown in FIG. 1. Further, the vehicle 30 can have additional elements to those shown in FIG. 1. In some arrangements, the vehicle 30 may be implemented without one or more of the elements shown in FIG. 1.

The vehicle 30 can include vehicle displays 31 such as screen displays, head-up displays, and/or any other suitable displays by which images acquired by a camera of the vision system may be displayed. The vehicle 30 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 30. One or more elements of the input system may be configured to enable a user to manually control aspects of the output system, such as the vehicle displays 31. For example, elements of the input system 130 may be configured to enable a user to manually switch between exterior camera views (in vehicles incorporating multiple exterior cameras), to turn exterior cameras on and off, to adjust display parameters such as contrast and brightness, and to control other camera and display functions.

The vision system may include a vehicle-mounted receiver (or "vehicle receiver") (generally designated 36) configured for receiving and processing video signals from the trailer camera system 60 (described in greater detail below).

The vehicle receiver 36 may incorporate (or be communicably coupled to) a vehicle transceiver 32 configured for transmitting signals to (and receiving signals from) a trailer camera system 60 of the vision system. In arrangements described herein, signals may be transmitted wirelessly to and from the trailer camera system 60 through Wi-Fi, Bluetooth and/or other wireless means. To this end, the vehicle transceiver 32 may incorporate (or be communicably coupled to) a first vehicle Wi-Fi antenna 33a and a second vehicle Wi-Fi antenna 33b. The vehicle transceiver 32 may also be configured for transmitting signals to (and receiving signals from) other elements of the vehicle receiver (described in greater detail below). In arrangements described herein, the vehicle Wi-Fi antennas 33a, 33b may electrically connected to elements of the vehicle receiver 36 and/or other elements of the vehicle 30 by suitable wire(s) or cable(s) 34.

Figure 2:
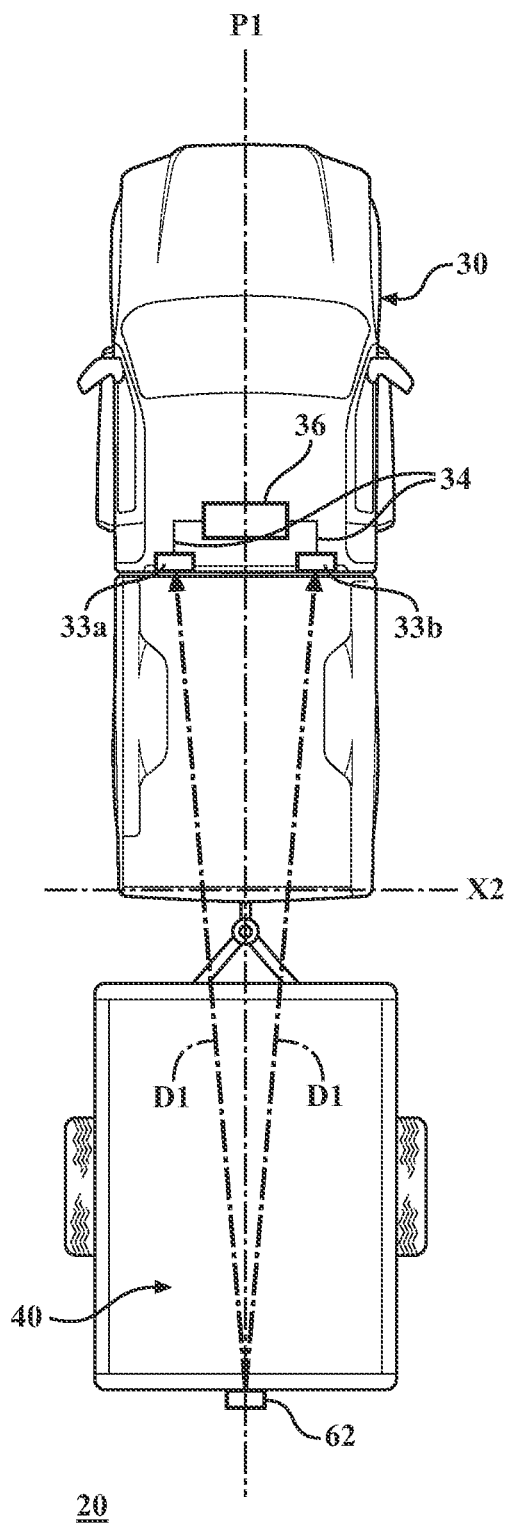
FIG. 2 is a schematic plan view of a vehicle-trailer system in accordance with an embodiment described herein, showing a situation where a trailer camera is mounted on a trailer in a location where Wi-Fi antenna(s) of the trailer camera system are equidistant from each of the vehicle Wi-Fi antennas.

Referring to FIG. 2, a vehicle central plane P1 may be defined as a vertical plane extending through a central longitudinal axis of the vehicle. Central plane P1 may define a fore-aft plane of the vehicle 30. The vehicle Wi-Fi antennas 33a, 33b may be mounted in protective housings attached to the vehicle. In one or more arrangements, the first and second Wi-Fi antennas 33a, 33b may be positioned as shown to the left and right sides of the vehicle central plane P1 and spaced equidistantly from the plane P1, along an axis X2 extending perpendicular to the plane P1. This arrangement may operate to position the trailer camera 62 at a location equidistant (at distance D1) from the vehicle Wi-Fi antennas 33a, 33b when the vehicle 30 and the trailer 40 are both pointed straight ahead and aligned along plane P1, and when the camera 62 is mounted to the trailer along the plane P1. This may promote constructive interference between Wi-Fi video signals received at the vehicle receiver 36, as described herein.

In some arrangements, the vehicle Wi-Fi antennas may be mounted along a rear of a roof of the vehicle so as to be closer to the trailer and to help to minimize vehicle and trailer interference with video signals transmitted by trailer camera antennas. In the example shown in FIG. 2, vehicle Wi-Fi antennas 33a and 33b are mounted along a rear of a roof of a pickup truck cab.

The vehicle Wi-Fi antennas 33a, 33b receive video data from Wi-Fi camera 62 located on the trailer 40 behind the vehicle 30. A Bluetooth antenna (not shown) incorporated into one of the antenna housings may be used to communicate status information about the Wi-Fi camera 62 to the vehicle receiver and to receive camera control commands from the vehicle 30. The Wi-Fi camera 62 may broadcast the video data to the vehicle receiver 36 via the vehicle Wi-Fi antennas 33a, 33b, and the vehicle receiver 36 streams the received data on one or more displays within the vehicle.

Referring to FIG. 1, the vehicle receiver 36 can include one or more processors 110. In one or more arrangements, the processor(s) 110 can be a main processor(s) of the receiver 36. The vehicle receiver 36 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include vehicle display data. In this context, "vehicle display data" means any information about any of the vehicle displays 31 that the vehicle 30 is equipped with, including the capabilities and other information about such displays. The data store(s) 115 may also contain other data.

In embodiments described herein, a vehicle receiver memory 112 may store at least a display control module 213 as described herein. The memory 112 may be a random-access memory (RAM), read-only memory (ROM), a hard-disk drive, a flash memory, or other suitable memory for storing the module 213. The module 213 may comprise, for example, computer-readable instructions that when executed by the processor(s) 110, cause the processor(s) 110 to perform various display control module functions as disclosed herein. Additional modules (not shown) may also be stored in memory 112. In one or more arrangements, the receiver memory 112, processor(s) 110, and data stores 115 may function collectively as an electronic control unit (ECU) of the receiver.

Referring again to FIG. 1, a sensor fusion/data processing module 215 may include an algorithm (or a computing device storing an algorithm) configured to accept received video signals and data from the vehicle Wi-Fi antennas as inputs. The sensor fusion/data processing module 215 may include or be configured to operate using, for instance, a Kalman filter, Bayesian network, or other algorithm(s). The sensor fusion/data processing module 215 may perform various signal processing operations and provide various assessments based on the information received from the trailer camera system via the vehicle Wi-Fi antennas. The assessments may include, for example, a degree of similarity between different waveforms transmitted from the trailer camera system 60, based on a comparison of the waveforms. Other assessments are possible.

The vehicle receiver 36 can include one or more modules, at least one of which is described herein. The module(s) can be implemented as computer-readable program code or instructions that, when executed by processor(s) 110, cause the processors to implement the various processes and functions described herein. One or more of the module(s) can be a component of the processor(s) 110, or one or more of the module(s) can be executed on and/or distributed among other processing systems to which the processor(s) 110 is operably connected. The module(s) can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the module(s) described herein can include artificial or computational intelligence elements, e.g., neural network, fuzzy logic or other machine learning algorithms. Further, in one or more arrangements, one or more of the module(s) can be distributed among a plurality of the modules described herein. In one or more arrangements, two or more of the modules described herein can be combined into a single module.

Transmission of signals, processing of signals and other operations performed as described herein on the video signals may be governed by provisions of IEEE 802.11 and any other applicable IEEE 802 technical standards, as known in the pertinent art. Also, values of any parameters to be used for purposes of comparison and/or evaluation may be stored in buffers allocated in a suitable memory.

Referring again to FIG. 1, the vehicle receiver 36 may incorporate (or be communicably coupled to) a display control module 213. The display control module 213 may be configured to perform and/or manage any processing required on video signals received from the trailer camera system 60, to enable the signals to be displayed on the vehicle displays 31. The display control module 213 may include computer-readable instructions that when executed by the processor(s) 110 cause the processor(s) to determine a signal-to-noise ratio based on estimated waveforms received from the trailer camera system antennas 81*a*, 81*b* via the vehicle-mounted Wi-Fi antennas 33*a*, 33*b*.

In one or more arrangements, to determine the signal-to-noise ratio based on estimated waveforms received from the vehicle Wi-Fi antennas 33*a*, 33*b*, the display control module 213 may include computer-readable instructions that when executed by the processor(s) 110 cause the processor(s) to compare the waveforms received from each vehicle Wi-Fi antenna for similarity. For example, in one or more arrangements, estimated waveforms received from each of vehicle Wi-Fi antennas 33*a*. 33*b* may be compared to determine if the waveforms have the same amplitudes and/or phase (within certain predetermined tolerance limits). In one or more arrangements, if the amplitudes, phases and/or other characteristics of the estimated waveforms as received are the same within the predetermined tolerance limits, the waveforms may be considered sufficiently similar to each other to enable the waveforms as received to be summed to provide a summed waveform. To this end, the display control module 213 may include computer-readable instructions that when executed by the processor(s) 110 cause the processor(s) to (if the estimated waveforms are considered to be sufficiently similar to each other) sum the waveforms as received to provide a summed waveform. For such a case, the display control module 213 may include computer-readable instructions that when executed by the processor cause the processor to determine, as the signal-to-noise ratio based on the received estimated waveforms, the signal-to-noise ratio of the summed waveform. Alternative methods may be used to determine the degree of similarity between the waveforms received from each of vehicle Wi-Fi antennas 33*a*, 33*b*.

In one or more arrangements, if the amplitudes, phases and/or other measured characteristics of the waveforms as received are not the same within the predetermined tolerance limits, the estimated waveforms may not be considered sufficiently similar to each other to enable the waveforms as received to be summed to provide a summed waveform. For such cases, the display control module 213 may include computer-readable instructions that when executed by the processor(s) 110 cause the processor(s) to perform adjustments on each received estimated waveform to reconstruct the waveform as transmitted by the camera system antennas 81*a*, 81*b*, thereby providing a reconstructed waveform relating to each vehicle Wi-Fi antenna.

Each of vehicle Wi-Fi antennas 33*a*, 33*b* will receive a component of the energy radiated by the camera Wi-Fi antennas 81*a*, 81*b*. Due to path differences between the camera Wi-Fi antennas and each of the vehicle Wi-Fi antennas (caused by such factors as lensing, the presence of obstacles between the antennas, etc.), each vehicle Wi-Fi antenna will receive a different version of the waveform transmitted by the camera antennas. Based on the assumption that the transmitted waveform should theoretically be the same as received at both vehicle Wi-Fi antennas 33*a*, 33*b*, the display control module 213 may be configured to compare the waveforms received from both the vehicle Wi-Fi antennas and attempt to reconstitute the best or most accurate versions of the transmitted waveform by performing equalization, phase alignment, and/or other adjustments to the waveforms received from the vehicle Wi-Fi antennas 33*a*, 33*b*, to attempt to achieve best match between the waveforms from both antennas.

The display control module 213 may include computer-readable instructions that when executed by the processor(s) 110 cause the processor(s) to sum the reconstructed waveforms to provide a summed waveform. The display control module 213 may also include computer-readable instructions that when executed by the processor(s) 110 cause the processor(s) to determine, as the signal-to-noise ratio based on the received waveforms, a signal-to-noise ratio of the summed waveform. The display control module may include computer-readable instructions that when executed by the processor(s) 110 cause the processor(s) to transmit signal-to-noise ratios and other information to the trailer camera system 60 via the vehicle Wi-Fi antennas 33*a*, 33*b*.

The trailer camera system 60 may be configured to transmit and receive signals receivable by the vehicle Wi-Fi antennas 33*a*, 33*b* through Wi-Fi, Bluetooth and/or other wireless means. Wireless communication between the trailer camera 62 and the vehicle Wi-Fi antennas 33*a*, 33*b* may be more suitable than wired communication due to the difficulty of incorporating wiring between the trailer camera system and the vehicle. The wireless communication or link may not only transmit video signals from the trailer camera system 60 to the vehicle Wi-Fi antennas, but also may transmit control signals and other information to the trailer camera system 60 via back channels or two way channels embedded in the wireless transmission channels. The back channel control signals may include data, control commands and/or other information usable by the trailer camera control module 90 (described in greater detail below) in controlling operations of the camera 62, such as activating or deactivating the camera or controlling trailer camera views to zoom or pan to a specific area around the trailer 40. In arrangements described herein, the trailer camera Wi-Fi antennas 81*a*, 82*a* may be co-located with the trailer camera 62 (e.g., in a common housing with the camera).

Figure 3:
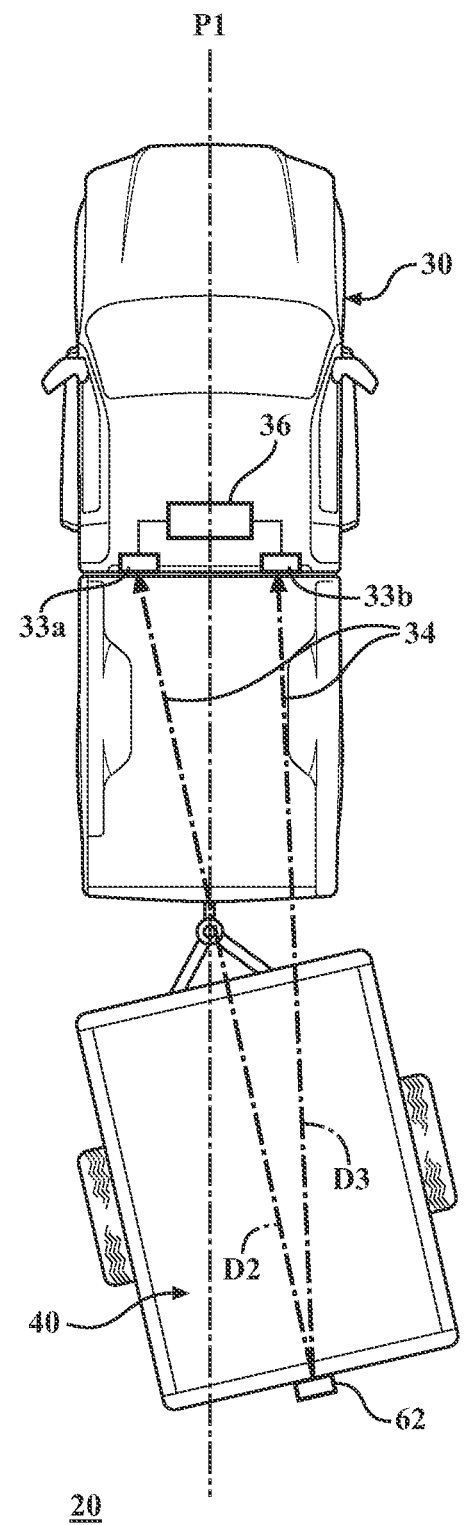
FIG. 3 is a schematic plan view of the vehicle-trailer system of FIG. 2 showing a situation where the trailer camera is mounted on the trailer in a location where Wi-Fi antenna(s) of the trailer camera system are spaced different distances from each of the vehicle Wi-Fi antennas.

The elements and features of the vision system described herein may enable the trailer camera 62 to be positioned at any desired location on the trailer 40. Thus, the trailer camera 62 may be positioned at a best location for providing a desired view of a portion of the trailer surroundings, regardless of trailer structure and the positions of the vehicle Wi-Fi antennas 33*a*, 33*b* relative to the camera position. For example, the camera 62 may be positioned along a rear of the trailer 40 as shown in FIGS. 2 and 3 to functions as a backup camera. Alternatively, the camera 62 may be positioned along a side of the trailer.

The trailer camera system 60 can include one or more processors 210. In one or more arrangements, the processor(s) 210 can be a main processor(s) of the trailer camera system 60. The trailer camera system 60 can include one or more data stores 216 for storing one or more types of data. The data store(s) 216 can include volatile and/or non-volatile memory. Examples of suitable data store(s) 216 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 216 can be a component of the processor(s) 210, or the data store(s) 216 can be operably connected to the processor(s) 210 for use thereby. The one or more data store(s) 216 can include camera data. In this context, "camera data" means any information about the camera, including the capabilities and other information about the camera.

The trailer camera system 60 may include (or be communicably coupled to) a wireless transceiver 92 configured for transmitting signals to (and receiving signals from) the vehicle Wi-Fi antennas 33*a*, 33*b*. In arrangements described herein, signals may be transmitted wirelessly to and from the vehicle Wi-Fi antennas 33a, 33b through Wi-Fi, Bluetooth and/or other wireless means. To this end, the trailer camera system transceiver 92 may incorporate (or be communicably coupled to) a pair of trailer camera system Wi-Fi antennas 81a, 81b.

In embodiments described herein, a trailer camera system memory 212 may store at least a camera control module 90 as described herein. The memory 212 may be a random-access memory (RAM), read-only memory (ROM), a hard-disk drive, a flash memory, or other suitable memory for storing the module 213. The module 213 may comprise, for example, computer-readable instructions that when executed by the processor(s) 210, cause the processor(s) 210 to perform various camera control module functions as disclosed herein. Additional modules (not shown) may also be stored in memory 212.

Referring again to FIG. 1, a sensor fusion/data processing module 315 may include an algorithm (or a computing device storing an algorithm) configured to accept control commands, data, parameters values and/or other information received from the vehicle receiver through the vehicle Wi-Fi antennas as inputs. The sensor fusion/data processing module 315 may include or be configured to operate using, for instance, a Kalman filter, Bayesian network, or other algorithm(s). The sensor fusion/data processing module 315 may perform various processing operations and provide various assessments based on the information received from the vehicle receiver 36 via the vehicle Wi-Fi antennas 33a, 33b. The assessments may include, for example, phase shifts to be applied to one or more waveforms to be transmitted to the vehicle receiver 36 prior to transmission. Other assessments are possible.

In one or more arrangements, the camera control module 90 may include computer-readable instructions that when executed by the processor(s) 210 cause the processor(s) to manage operation of the camera 62. For example, the camera control module 90 may control transmission of video signals to the vehicle Wi-Fi antennas 33a, 33b in accordance with automated control functions, such as any conversion and/or processing of image data required for purposes of transmission, including application of phase shifts to video signals prior to transmission. The camera control module 90 may also control operations of the camera 62 responsive to manual control commands received from the vehicle 30, such as manually-initiated camera "on/off" commands or commands.

FIG. 2 is a schematic plan view of a vehicle-trailer system 20 in accordance with an embodiment described herein, showing a situation where a trailer camera 62 resides in a location where Wi-Fi antenna(s) 81a, 81b of the trailer camera system 60 are equidistant from each of the vehicle Wi-Fi antennas 33a, 33b. FIG. 3 is a schematic plan view of the vehicle-trailer system 20 of FIG. 2 showing a situation where the trailer camera 62 resides in a location where Wi-Fi antenna(s) 81a, 81b of the trailer camera system are spaced different distances from each of the vehicle Wi-Fi antennas 33a, 33b. Referring to FIG. 3, it may be seen that, as the trailer 40 rotates off center with respect to the towing vehicle 30 during a turn, or in other cases where the camera 62 is moved off-center from the plane P1 (e.g., when the camera 62 is purposely positioned along a side of the trailer or otherwise spaced apart from the plane P1), the camera 62 is no longer positioned equidistantly at distance D1 from both vehicle Wi-Fi antennas 33a, 33b (i.e., camera 62 may reside at a distance D2 from Wi-Fi-antenna 33a and at a distance D3 from Wi-Fi antenna 33b, where D2>D3. using known principles of beamforming as described herein, calculated phase shifts may be applied to one or more of the waveforms to be transmitted by the camera system Wi-Fi antennas 81a, 82a and received by the vehicle Wi-Fi antennas 33a, 33b, to promote constructive interference of the as received by the vehicle receiver 36.

As known in the pertinent art, beamforming involves applying a phase shift or time delay to one or more signals prior to transmission of the signal(s) so that the phase shifted signal(s) will arrive at a transmission destination in-phase with other, unshifted signals. This may promote constructive interference between the signals when the signals are summed or combined at the receiving end. As described herein, the trailer camera control module may apply phase shifts to video waveforms prior to transmission of the waveforms by the trailer camera Wi-Fi antennas. The phase shifts may be directed to eliminating any mismatches or differences between the transmitted waveforms due to path length differences, obstacles residing along the signal transmission path, etc., so that a signal-to-noise ratio (SNR) determined at the vehicle receiver 36 and based on waveforms received from the vehicle Wi-Fi antennas 33a, 33b is maximized. Parameters of the phase shift(s) to be applied may be determined by the camera control module 90 based on an SNR determined from waveforms most recently transmitted to the vehicle receiver 36.

For example, in one or more arrangements, a phase shift in a first direction may be applied to a waveform based on an SNR and link characterization information received from the vehicle receiver. The phase-shifted waveform may then be transmitted to the receiver 36, where an SNR of the phase-shifted waveform is determined and transmitted through the vehicle Wi-Fi antennas 33a, 33b to the trailer camera system Wi-Fi antennas 81a, 81b. This received phase-shifted waveform may also be processed by the display control module for display and displayed on at least one vehicle display. Based on any changes in the SNR due to phase-shifting of the most-recently transmitted waveform, the camera control module 90 may determine another phase shift to be applied to one or more waveforms to be transmitted immediately following the most-recently transmitted waveform. For example, if the SNR based on the most-recently transmitted waveform indicates that the received signal strength increased due to application of the phase shift in the first direction, the trailer camera control module 90 may determine and apply another phase shift in the first direction. However, if the SNR based on the most-recently transmitted waveform indicates that the received signal strength decreased due to application of the phase shift in the first direction, the trailer camera control module 90 may determine and apply another phase shift in a second, opposite direction.

For purposes described herein, "link characterization information" may include all metrics relating to performance of the wireless bus connecting the trailer camera system 60 with the vehicle receiver 36 that are necessary to allow the control and processing algorithms of both the trailer camera system 60 and vehicle receiver 36 to determine the best means by which to transmit and receive data across the bus, while maintaining pertinent data rate and data delay targets. Non-exclusive examples of link characterization information may include bus bandwidth based on current noise conditions (e.g., provided by negotiating lower data rates to improve link reliability based on SNR of previous received data packets), negotiated filtering and phase adjustments to be applied to both the waveforms to be transmitted by the camera system Wi-Fi antennas and the waveforms received by the vehicle receiver 36 for purposes of reconstruction as previously described, and sharing success/failure notifications for received messages to trigger re-transmission where necessary.

Determination and application of phase shifts of varying directions and magnitudes and processing and display of the phase-shifted waveforms may continue as described in an attempt to maximize the SNL determined based on the received waveforms. These operations may be performed continuously while the camera is switched on, and may be stopped when the camera is turned off. "Continuous" cycling and determination, estimation, calculation, control, acquisition, etc. of any data and/or parameter values described herein refers to determination, estimation, acquisition, calculation, and control of the data and parameter values as soon as possible in accordance with times required for data and information acquisition, processing and decision-making. These determinations may be made constantly during operation of the trailer camera system 60.

Using the above procedure, based on feedback in the form of SNR and link characterization information from the vehicle receiver, the vision system may constantly and automatically apply phase-shifts to waveforms to be transmitted from the camera to the vehicle receiver, to provide (at the receiver) a video signal having the best signal-to-noise ratio available for any given configuration and position of the trailer with respect to the vehicle, and despite any obstacles blocking line-of-sight for transmission between the camera system antennas and the vehicle Wi-Fi antennas. This may aid in maximizing the quality of images presented on the vehicle display(s)

In one or more arrangements, the camera control module 90 may include computer-readable instructions that when executed by the processor(s) 210 cause the processor(s) to, using an SNR and link characterization information received from the display control module 213, estimate a phase shift to be applied to each future waveform to be transmitted by an associated one of camera system antennas 81*a*, 81*b*, to increase a signal-to-noise ratio based on future waveforms received by the receiver 36 from the vehicle Wi-Fi antennas. A "future waveform" may be a waveform that has not yet been transmitted by one of the camera Wi-Fi antennas 81*a*, 81*b*, but is slated to be the next waveform transmitted by one of the antennas. An "estimated waveform" for transmission to the vehicle receiver may be a waveform to which a phase shift resulting from the estimation process (using the SNR and link characterization information received from the display control module 213) has been applied if the estimated phase shift is non-zero, or an unshifted waveform if the estimated phase shift is determined to be "0" (zero). In some cases, the phase shift estimated to increase the signal-to-noise ratio as determined by the receiver may be "0". In such cases, the estimated waveform may have the same phase as the prior waveform most recently-received by the receiver.

The camera control module 90 may also include computer-readable instructions that when executed by the processor(s) 110 cause the processor(s) to apply each phase shift to an associated future waveform to provide estimated waveforms. The camera control module 90 may also include computer-readable instructions that when executed by the processor(s) 110 cause the processor(s) to control operation of the camera system antennas 81*a*, 81*b* to transmit the waveforms through the vehicle Wi-Fi antennas 33*a*, 33*b* to the vehicle receiver 36 for determination of a signal-to-noise ratio based on the received estimated waveforms.

Figure 4:
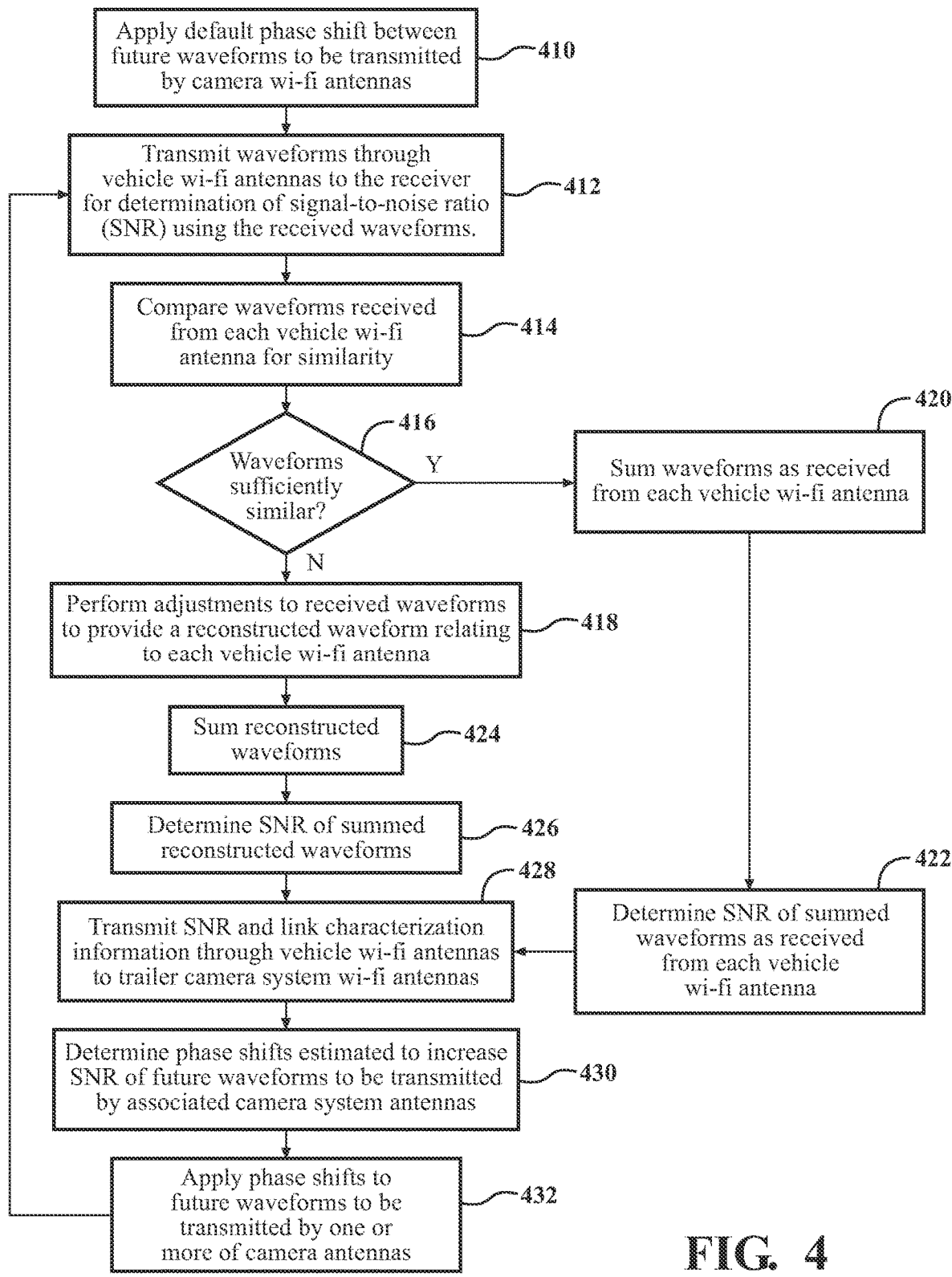
FIG. 4 is a flow diagram illustrating operation of a vision system in accordance with an embodiment described herein.

FIG. 4 is a schematic flow diagram illustrating operation of the vision system in accordance with an embodiment described herein.

In block 410, camera control module 90 may apply a default phase shift between future waveforms to be transmitted by the camera Wi-Fi antennas 81*a*, 81*b*. The default phase shift may be applied cases when the camera 62 is switched from an "off" state to an "on" state and prior to transmission of the first waveform to the receiver 36. In this case, a default phase shift of "0" may be applied to the waveform to generate a baseline for further phase shifts based on the SNR determined from the initial waveform.

In block 412, the waveforms may be transmitted from camera Wi-Fi antennas 81*a*, 81*b* through vehicle Wi-Fi antennas 33*a*, 33*b* to the receiver 36 for determination of signal-to-noise ratio (SNR) using the received waveforms. The display control module 213 may compare the waveforms received from the vehicle Wi-Fi antennas 33*a*, 33*b* (block 414) and determine the degree of similarity of the waveforms (block 416). if the waveforms are determined to be sufficiently similar to each other as received, the display control module 213 may (in block 420) sum waveforms as received from each vehicle Wi-Fi antenna.

The display control module 213 may then (in block 422) determine an SNR based on the summed waveforms as received from each of vehicle Wi-Fi antennas 33*a*, 33*b*. In cases where the waveforms are determined to be sufficiently similar to each other, an SNR of the summed waveforms as received from each vehicle Wi-Fi antenna will be the SNR fed back to the camera control module 90 for use in determining future phase shifts as previously described.

The display control module 213 may then (in block 428) transmit the SNR and link characterization information through the vehicle Wi-Fi antennas 33*a*, 33*b* to the trailer camera system Wi-Fi antennas 81*a*, 81*b*. Using the SNR and link characterization information received from the receiver, the camera control module 90 may (in block 430) determine phase shifts estimated to increase the SNR determined from future waveforms to be transmitted by associated camera system antennas. The camera control module 90 may then (in block 432) apply phase shifts to future waveforms to be transmitted by one or more of the camera antennas 81*a*, 81*b*. Control may then pass to back to block 412 for repetition of the steps just described for as long as the camera in switched on.

Returning to block 416, if the waveforms are not determined to be sufficiently similar to each other as received from the vehicle Wi-Fi antennas 33*a*, 33*b*, the display control module 213 may (in block 418) perform adjustments to the received waveforms to provide a reconstructed waveform relating to each vehicle Wi-Fi antenna, as previously described herein. The display control module 213 may then (in block 424) sum the reconstructed waveforms. The display control module 213 may then (in block 426) determine an SNR based on the summed reconstructed waveforms. In cases where the waveforms are not determined to be sufficiently similar to each other, an SNR based on the summed reconstructed waveforms will be the SNR fed back to the camera control module 90 for use in determine future phase shifts as previously described. Control may then pass to block 428, where the SNR and link characterization information are transmitted through the vehicle Wi-Fi antennas 33*a*, 33*b* to the trailer camera system Wi-Fi antennas 81*a*, 81*b*.

Using the systems and procedures described herein, embodiments of the vision system may constantly and automatically apply phase-shifts to waveforms to be transmitted from the camera to the vehicle receiver, to provide (at the receiver) a video signal having the best signal-to-noise ratio available for any given configuration and position of the trailer with respect to the vehicle, and despite any obstacles blocking line-of-sight for transmission between the camera system antennas and the vehicle Wi-Fi antennas. This may enable the trailer camera to be mounted at a location on the trailer where it can provide the best view of any particular portion of the trailer surroundings.

In further aspects of the embodiments described herein, the present disclosure describes a method, in a vehicle-trailer system, for maximizing a signal-to-noise ratio (SNR) of a video signal received from a dual antenna trailer-mounted camera system, the method comprising steps of:

in a vehicle-mounted receiver:
  a) determining a signal-to-noise ratio based on waveforms received from the camera system antennas via a pair of spaced-apart vehicle-mounted Wi-Fi antennas;
in the camera system:
  b) using the signal-to-noise ratio and link characterization information, estimating a phase shift to be applied to each future waveform to be transmitted by an associated the camera system antenna, to increase a signal-to-noise ratio based on future waveforms received by the receiver from the vehicle Wi-Fi antennas;
  c) applying each phase shift to an associated future waveform to provide estimated waveforms; and
  d) controlling operation of the camera system antennas to transmit the estimated waveforms through the vehicle Wi-Fi antennas to the receiver for determination of a signal-to-noise ratio based on the received estimated waveforms.

In further aspects of the embodiments described herein, the present disclosure describes a non-transitory computer-readable medium for of maximizing a signal-to-noise ratio (SNR) of a video signal received from a dual antenna trailer-mounted camera system of a vehicle-trailer system, the medium storing instructions that when executed by one or more processors cause the one or more processors to:

in a vehicle-mounted receiver:
  a) determine a signal-to-noise ratio based on waveforms received from the camera system antennas via a pair of spaced-apart vehicle-mounted Wi-Fi antennas;
in the camera system:
  b) using the signal-to-noise ratio and link characterization information, estimate a phase shift to be applied to each future waveform to be transmitted by an associated the camera system antenna, to increase a signal-to-noise ratio based on future waveforms received by the receiver from the vehicle Wi-Fi antennas;
  c) apply each phase shift to an associated future waveform to provide estimated waveforms; and
  d) control operation of the camera system antennas to transmit the estimated waveforms through the vehicle Wi-Fi antennas to the receiver for determination of a signal-to-noise ratio based on the received estimated waveforms.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. In a vehicle-trailer system, a vision system configured to maximize a signal-to-noise ratio (SNR) of a video signal received from a trailer-mounted camera system, the vision system comprising:
   a vehicle-mounted receiver;
   a pair of spaced-apart vehicle-mounted Wi-Fi antennas; and
   a dual-antenna trailer-mounted camera system configured to transmit a waveform incorporating video data to the vehicle-mounted Wi-Fi antennas,
   the receiver including a processor and a memory communicably coupled to the processor and storing a display control module including computer-readable instructions that when executed by the processor cause the processor to:
   determine a signal-to-noise ratio based on estimated waveforms received from the camera system antennas via the vehicle-mounted Wi-Fi antennas; and
   control operation of at least one vehicle display to display a video signal based on the received waveforms,
   the camera system including a processor and a memory communicably coupled to the processor and storing a camera control module including computer-readable instructions that when executed by the processor cause the processor to:
      using the SNR and link characterization information, estimate a phase shift to be applied to each future waveform to be transmitted by an associated camera system antenna, to increase a signal-to-noise ratio based on future waveforms received by the receiver from the vehicle Wi-Fi antennas;
      apply each phase shift to an associated future waveform to provide estimated waveforms; and
      control operation of the camera system antennas to transmit the estimated waveforms through the vehicle Wi-Fi antennas to the receiver for determination of the signal-to-noise ratio based on the received estimated waveforms.

2. The vision system of claim 1, wherein the display control module further includes computer-readable instructions that when executed by the processor cause the processor to:
   compare waveforms received from each vehicle Wi-Fi antenna for similarity;
   if the waveforms are not sufficiently similar:
      perform adjustments on each received waveform to reconstruct the waveform as transmitted by the camera system antennas, thereby providing a reconstructed waveform relating to each vehicle Wi-Fi antenna;
      sum the reconstructed waveforms to provide a summed waveform; and
      determine, as the signal-to-noise ratio based on the received waveforms, a signal-to-noise ratio of the summed waveform.

3. The vision system of claim 2, wherein the display control module further includes computer-readable instructions that when executed by the processor cause the processor to perform adjustments including phase alignment and/or equalization on each received waveform.

4. The vision system of claim 1, wherein the display control module further includes computer-readable instructions that when executed by the processor cause the processor to:
   compare the waveforms received from each vehicle Wi-Fi antenna for similarity;
   if the received waveforms are sufficiently similar, sum the waveforms as received to provide a summed waveform; and
   determine, as the signal-to-noise ratio based on the received waveforms, a signal-to-noise ratio of the summed waveform.

5. In a vehicle-trailer system, a method of maximizing a signal-to-noise ratio (SNR) of a video signal received from a dual antenna trailer-mounted camera system, the method comprising steps of:
in a vehicle-mounted receiver:
 a) determining a signal-to-noise ratio based on waveforms received from the camera system antennas via a pair of spaced-apart vehicle-mounted Wi-Fi antennas;
in the camera system:
 b) using the signal-to-noise ratio and link characterization information, estimating a phase shift to be applied to each future waveform to be transmitted by an associated the camera system antenna, to increase a signal-to-noise ratio based on future waveforms received by the receiver from the vehicle Wi-Fi antennas;
 c) applying each phase shift to an associated future waveform to provide estimated waveforms; and
 d) controlling operation of the camera system antennas to transmit the estimated waveforms through the vehicle Wi-Fi antennas to the receiver for determination of a signal-to-noise ratio based on the received estimated waveforms.

6. The method of claim 5, further comprising a step of repeating steps (a)-(d) as long as the camera system is turned on.

7. The method of claim 5, further comprising steps of:
comparing the waveforms received from each vehicle Wi-Fi antenna for similarity;
if the waveforms are sufficiently similar, determining the signal-to-noise ratio by:
 summing the waveforms to provide a summed waveform; and
 determining, as the signal-to-noise ratio, the signal-to-noise ratio of the summed waveform;
if the waveforms are not sufficiently similar, determining the signal-to-noise ratio by:
 performing adjustments on each received waveform to reconstruct the waveform as transmitted by the camera system antennas, thereby providing a reconstructed waveform relating to each vehicle Wi-Fi antenna;
 summing the reconstructed waveforms to provide a summed waveform; and
 determining, as the signal-to-noise ratio, the signal-to-noise ratio of the summed waveform.

8. The method of claim 7, further comprising a step of, if the waveforms are not sufficiently similar, performing adjustments including phase alignment and/or equalization on each received waveform.

9. A non-transitory computer-readable medium for of maximizing a signal-to-noise ratio (SNR) of a video signal received from a dual antenna trailer-mounted camera system of a vehicle-trailer system, the medium storing instructions that when executed by one or more processors cause the one or more processors to:
in a vehicle-mounted receiver:
 a) determine a signal-to-noise ratio based on waveforms received from the camera system antennas via a pair of spaced-apart vehicle-mounted Wi-Fi antennas;
in the camera system:
 b) using the signal-to-noise ratio and link characterization information, estimate a phase shift to be applied to each future waveform to be transmitted by an associated the camera system antenna, to increase a signal-to-noise ratio based on future waveforms received by the receiver from the vehicle Wi-Fi antennas;
 c) apply each phase shift to an associated future waveform to provide estimated waveforms; and
 d) control operation of the camera system antennas to transmit the estimated waveforms through the vehicle Wi-Fi antennas to the receiver for determination of a signal-to-noise ratio based on the received estimated waveforms.

10. The non-transitory computer-readable medium of claim 9 storing further instructions that when executed by one or more processors cause the one or more processors to repeat steps (a)-(d) as long as the camera system is turned on.

11. The non-transitory computer-readable medium of claim 9 storing further instructions that when executed by one or more processors cause the one or more processors to:
compare the waveforms received from each vehicle Wi-Fi antenna for similarity;
if the waveforms are sufficiently similar, determine the signal-to-noise ratio by:
 summing the waveforms to provide a summed waveform; and
 determining, as the signal-to-noise ratio, the signal-to-noise ratio of the summed waveform;
if the waveforms are not sufficiently similar, determine the signal-to-noise ratio by:
 performing adjustments on each received waveform to reconstruct the waveform as transmitted by the camera system antennas, thereby providing a reconstructed waveform relating to each vehicle Wi-Fi antenna;
 summing the reconstructed waveforms to provide a summed waveform; and
 determining, as the signal-to-noise ratio, the signal-to-noise ratio of the summed waveform.

12. The non-transitory computer-readable medium of claim 9 storing further instructions that when executed by one or more processors cause the one or more processors to, if the waveforms are not sufficiently similar, perform adjustments including phase alignment and/or equalization on each received waveform.

* * * * *